US010448739B2

(12) United States Patent
Derelov et al.

(10) Patent No.: US 10,448,739 B2
(45) Date of Patent: Oct. 22, 2019

(54) PANELS COMPRISING A MECHANICAL LOCKING DEVICE AND AN ASSEMBLED PRODUCT COMPRISING THE PANELS

(71) Applicant: VÄLINGE INNOVATION AB, Viken (SE)

(72) Inventors: Peter Derelov, Helsingborg (SE); Mats Nilsson, Viken (SE)

(73) Assignee: VALINGE INNOVATION AB, Viken (SE)

(*) Notice: Subject to any disclaimer, the term of this patent is extended or adjusted under 35 U.S.C. 154(b) by 0 days.

(21) Appl. No.: 15/271,622

(22) Filed: Sep. 21, 2016

(65) Prior Publication Data

US 2017/0079433 A1    Mar. 23, 2017

(30) Foreign Application Priority Data

Sep. 22, 2015 (SE) ...................................... 1551211

(51) Int. Cl.
*A47B 96/20* (2006.01)
*A47B 47/04* (2006.01)
(Continued)

(52) U.S. Cl.
CPC .......... *A47B 96/201* (2013.01); *A47B 47/042* (2013.01); *F16B 12/125* (2013.01);
(Continued)

(58) Field of Classification Search
CPC . A47B 47/042; A47B 96/201; A47B 2230/16; A47B 2230/06; F16B 12/24;
(Continued)

(56) References Cited

U.S. PATENT DOCUMENTS 291,032 A     1/1884  Cleland
634,581 A    10/1899  Miller
(Continued)

FOREIGN PATENT DOCUMENTS

CH    685 276 A5    5/1995
CH    696 889 A5    1/2008
(Continued)

OTHER PUBLICATIONS

U.S. Appl. No. 15/584,633, Christian Boo, filed May 2, 2017.
(Continued)

*Primary Examiner* — Janet M Wilkens
*Assistant Examiner* — Timothy M Ayres
(74) *Attorney, Agent, or Firm* — Buchanan Ingersoll & Rooney P.C.

(57) ABSTRACT

A set of panels including a panel with a first main plane and an adjacent panel with a second main plane, wherein the panel and the adjacent panel are provided with an angleable locking device for locking a first edge of the panel to a second edge of the adjacent panel. The first main plane is essentially perpendicular to the second main plane. The angleable locking device includes an edge groove at the first edge and a tongue groove at the second edge. The edge groove includes a flexible tongue arranged in an insertion groove at a first side of the edge groove. The angleable locking device is configured to be unlocked by an angling motion of the panel relative the adjacent panel, such that an angle between the first and the second main plane increases.

17 Claims, 11 Drawing Sheets

(51) Int. Cl.
- *F16B 12/24* (2006.01)
- *F16B 12/12* (2006.01)
- *F16B 12/44* (2006.01)
- *F16B 12/46* (2006.01)
- *E04B 1/61* (2006.01)

(52) U.S. Cl.
CPC .............. *F16B 12/24* (2013.01); *F16B 12/44* (2013.01); *F16B 12/46* (2013.01); *A47B 2230/06* (2013.01); *A47B 2230/16* (2013.01); *E04B 1/6141* (2013.01); *E04B 2001/6195* (2013.01)

(58) Field of Classification Search
CPC ........ F16B 12/125; F16B 12/44; F16B 12/46; E04B 1/6141; E04B 2001/6195
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A * | 4/1934 | Heppenstall ......... A47B 47/042 312/263 |
| 2,360,451 A | 10/1944 | Stone |
| 2,362,904 A | 11/1944 | Kramer |
| 2,496,184 A * | 1/1950 | Von Canon .......... A47B 88/941 144/354 |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,765,465 A | 10/1973 | Gulistan |
| 3,784,271 A | 1/1974 | Schreiber |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crovvder |
| 4,279,397 A | 7/1981 | Larsson |
| 4,308,961 A | 1/1982 | Kunce |
| 4,324,517 A | 4/1982 | Dey |
| 4,509,648 A | 4/1985 | Govang |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,360,121 A | 11/1994 | Sothman |
| 5,375,802 A | 12/1994 | Branham, II |
| 5,423,155 A | 6/1995 | Bauer |
| 5,475,960 A | 12/1995 | Lindal |
| 5,499,886 A | 3/1996 | Short et al. |
| 5,527,103 A | 6/1996 | Pittman |
| 5,658,086 A | 8/1997 | Brokaw et al. |
| 5,893,617 A | 4/1999 | Lee |
| 5,944,294 A | 8/1999 | Baer |
| 5,950,389 A | 9/1999 | Porter |
| 6,142,436 A | 11/2000 | Thurston et al. |
| 6,312,186 B1 | 11/2001 | Röck et al. |
| 6,363,645 B1 | 4/2002 | Hunter |
| 6,413,007 B1 | 7/2002 | Lambright |
| 6,491,172 B2 | 12/2002 | Chance |
| 6,505,452 B1 | 1/2003 | Hannig |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,365,499 B2 | 2/2013 | Nilsson et al. |
| 8,387,327 B2 | 3/2013 | Pervan |
| 8,495,849 B2 | 7/2013 | Pervan |
| 8,505,257 B2 | 8/2013 | Boo et al. |
| 8,544,230 B2 | 10/2013 | Pervan |
| 8,602,227 B1 | 12/2013 | McDonald |
| 8,615,952 B2 | 12/2013 | Engström |
| 8,745,952 B2 | 6/2014 | Perra |
| 8,764,137 B2 | 7/2014 | Fehre |
| 8,833,028 B2 | 9/2014 | Whispell et al. |
| 8,864,407 B1 | 10/2014 | Sorum |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 * | 5/2017 | Boo ................. A47B 47/0075 |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 2002/0170258 A1 | 11/2002 | Schwitte et al. |
| 2005/0042027 A1 | 2/2005 | Migli |
| 2006/0091093 A1 | 5/2006 | Armari |
| 2006/0101769 A1 | 5/2006 | Pervan et al. |
| 2006/0236642 A1 | 10/2006 | Pervan |
| 2006/0273085 A1 | 12/2006 | Casto |
| 2007/0006543 A1 | 1/2007 | Engström |

(56) References Cited

U.S. PATENT DOCUMENTS

| | | |
|---|---|---|
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0173122 A1 | 7/2010 | Susnjara |
| 2010/0289389 A1 | 11/2010 | Crabtree, II |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2014/0055018 A1 | 2/2014 | Shein et al. |
| 2014/0111076 A1* | 4/2014 | Devos .................. F16B 12/125 312/330.1 |
| 2014/0286701 A1 | 9/2014 | Sauer |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2019/0113061 A1 | 4/2019 | Håkansson et al. |
| 2019/0166989 A1 | 6/2019 | Boo et al. |

FOREIGN PATENT DOCUMENTS

| | | |
|---|---|---|
| CH | 698 988 B1 | 12/2009 |
| CN | 101099618 A | 1/2008 |
| CN | 203424576 U | 2/2014 |
| DE | 26 35 237 A | 2/1978 |
| DE | 31 03 281 A1 | 8/1982 |
| DE | 20 2008 011 589 U1 | 11/2008 |
| DE | 20 2009 008 825 U1 | 10/2009 |
| DE | 10 2009 041 142 A1 | 3/2011 |
| DE | 10 2014 110 124 A1 | 1/2016 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| GB | 1 022 377 A | 3/1966 |
| GB | 2 482 213 A | 1/2012 |
| GB | 2 520 927 A | 6/2015 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 99/22150 A1 | 5/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |

(56) References Cited

FOREIGN PATENT DOCUMENTS

| WO | WO 2014/108114 A1 | 7/2014 |
|---|---|---|
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2017/135874 A1 | 8/2017 |

OTHER PUBLICATIONS

U.S. Appl. No. 15/642,757, Peter Derelov, filed Jul. 6, 2017.
U.S. Appl. No. 15/646,714, Derelöv et al.
U.S. Appl. No. 15/562,254, Derelöv.
U.S. Appl. No. 15/567,507, Boo et al.
U.S. Appl. No. 15/794,491, Derelöv.
U.S. Appl. No. 15/848,164, Fransson, et al.
U.S. Appl. No. 15/923,701, Derelöv.
International Search Report/Written Opinion dated Nov. 28, 2016 in PCT/SE2016/050887, ISA/SE, Stockholm, SE, 16 pages.
Derelöv, Peter, et al., U.S. Appl. No. 15/646,714 entitled "Assembled Product and a Method of Assembling the Product", filed Jul. 11, 2017.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
Derelöv, Peter, U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.
Derelöv, Peter, U.S. Appl. No. 15/923,701 entitled "Panels Comprising a Mechanical Locking Device and an Assembled Product Comprising the Panels", filed Mar. 16, 2018.
U.S. Appl. No. 15/415,356, Derelöv, et al.
U.S. Appl. No. 15/422,798, Fridlund.
U.S. Appl. No. 15/428,469, Fridlund.
U.S. Appl. No. 15/428,504, Boo.
U.S. Appl. No. 15/432,190, Fridlund.
Derelöv, Peter, et al., U.S. Appl. No. 15/415,356 entitled "Panels Comprising a Mechanical Locking Device and an Assembled Product Comprising the Panels", filed Jan. 25, 2017.
Fridlund, Magnus, U.S. Appl. No. 15/422,798 entitled "Set of Panels for an Assembled Product," filed Feb. 2, 2017.
Fridlund, Magnus, U.S. Appl. No. 15/428,469 entitled "Element and Method for Providing Dismantling Groove," filed Feb. 9, 2017.
Boo, Christian. U.S. Appl. No. 15/428,504 entitled "Set of Panel-Shaped Elements for a Composed Element," filed Feb. 9, 2017.
Fridlund, Magnus, U.S. Appl. No. 15/432,190 entitled "Method for Forming a Panel," filed Feb. 14, 2017.
U.S. Appl. No. 14/158,165, Peter Derelöv, filed Jan. 17, 2014.
U.S. Appl. No. 14/486,681, Hans Brännström, filed Sep. 15, 2014.
U.S. Appl. No. 14/515,988, Niclas Håkansson, filed Oct. 16, 2014.
U.S. Appl. No. 14/573,473, Peter Derelöv, filed Dec. 17, 2014 (Cited herein as US Patent Application Publication No. 2015/0196118 A1 of Jul. 16, 2015).
U.S. Appl. No. 14/573,572, Christian Boo, filed Dec. 17, 2014 (Cited herein as US Patent Application Publication No. 2015/0198191 A1 of Jul. 16, 2015).
U.S. Appl. No. 14/972,949, Christian Boo, filed Dec. 17, 2015 (Cited herein as US Patent Application Publication No. 2016/0174704 A1 of Jun. 23, 2016).
U.S. Appl. No. 15/171,403, Peter Derelöv, filed Jun. 2, 2016 (Cited herein as US Patent Application Publication No. 2016/0270531 A1 of Sep. 22, 2016).
U.S. Appl. No. 15/308,872, Darko Pervan, filed Nov. 4, 2016.
U.S. Appl. No. 15/366,704, Peter Derelöv, filed Dec. 1, 2016.
U.S. Appl. No. 15/379,791, Niclas Håkansson, filed Dec. 15, 2016.
U.S. Appl. No. 15/308,872, Pervan.
U.S. Appl. No. 15/366,704, Derelöv.
U.S. Appl. No. 15/379,791, Håkansson et al.
Pervan, Darko, U.S. Appl. No. 15/308,872 entitled "Mechanical Locking System for Building Panels," filed Nov. 4, 2016.
Derelöv, Peter, U.S. Appl. No. 15/366,704 entitled "Panels Comprising a Mechanical Locking Device and an Assembled Product comprising the Panels", filed Dec. 1, 2016.
Håkansson, Niclas, et al., U.S. Appl. No. 15/379,791 entitled "Mechanical Locking System for Building Panels," filed Dec. 15, 2016.
U.S. Appl. No. 15/956,949, Derelöv.
U.S. Appl. No. 15/978,630, Fransson, et al.
U.S. Appl. No. 16/027,479, Boo, et al.
Derelöv, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
U.S. Appl. No. 16/220,574, Derelöv.
U.S. Appl. No. 16/220,585, Derelöv.
U.S. Appl. No. 16/228,975, Håkansson et al.
Extended European Search Report issued in EP Application No. 16849109.0, dated Jan. 16, 2019, European Patent Office, Munich, DE, 9 pages.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Håkansson, Niclas, et al., U.S. Appl. No. 16/228,975 entitled "Mechanical Locking System for Building Panels," filed Dec. 21, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office dated Mar. 22, 2019.
Boo, Christian, U.S. Appl. No. 16/386,732 entitled "Set of Panels With a Mechanical Locking Device," filed in the U.S. Patent and Trademark Office dated Apr. 17, 2019.
Boo, Christian, U.S. Appl. No. 16/386,810 entitled "Set of Panels With a Mechanical Locking Device," filed in the U.S. Patent and Trademark Office dated Apr. 17, 2019.
Boo, Christian, U.S. Appl. No. 16/386,824 entitled "Set of Panels With a Mechanical Locking Device," filed in the U.S. Patent and Trademark Office dated Apr. 17, 2019.
Derelöv, Peter, U.S. Appl. No. 16/386,874 entitled "Symmetric Tongue and T-Cross," filed in the U.S. Patent and Trademark Office dated Apr. 17, 2019.

\* cited by examiner

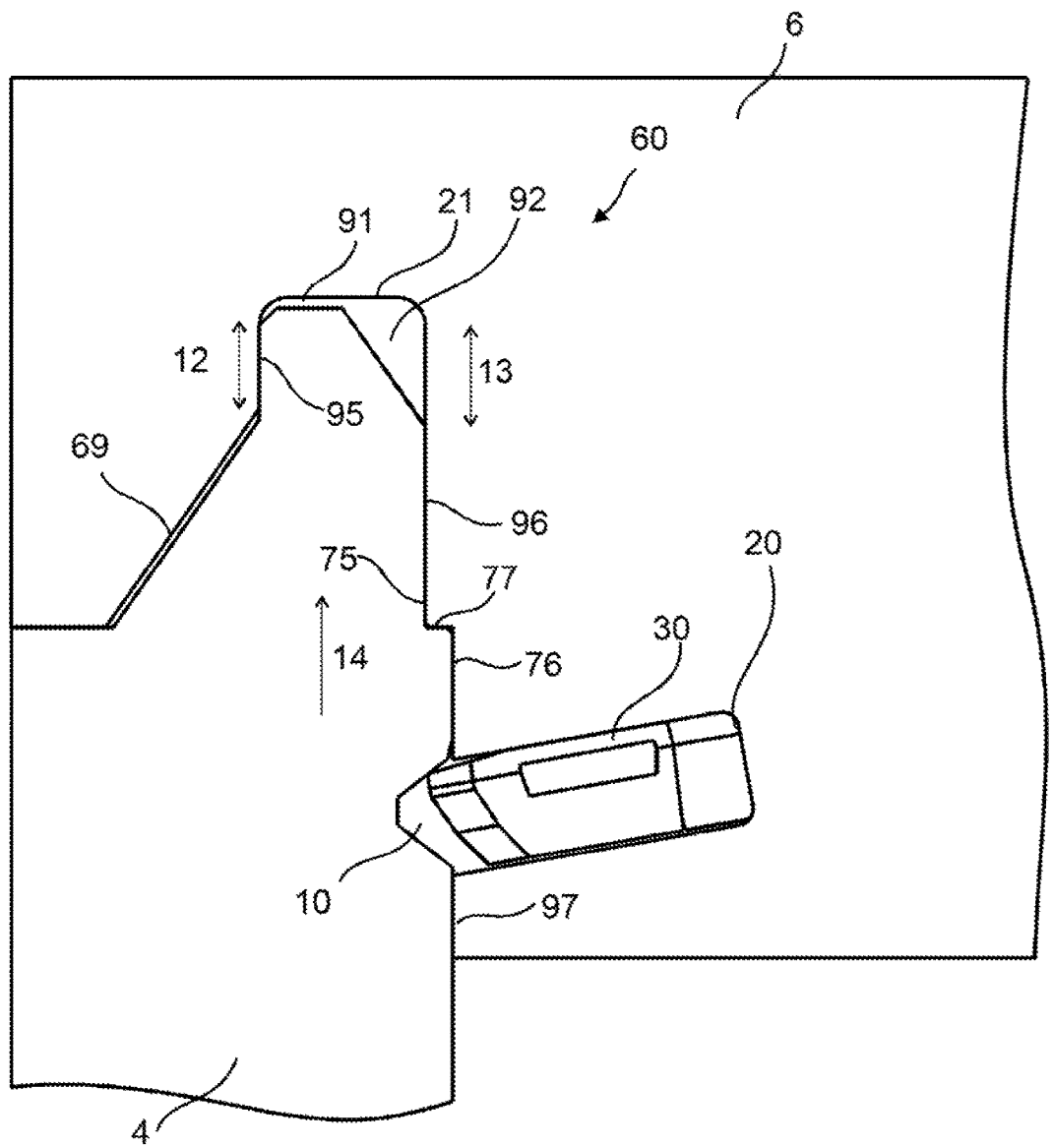

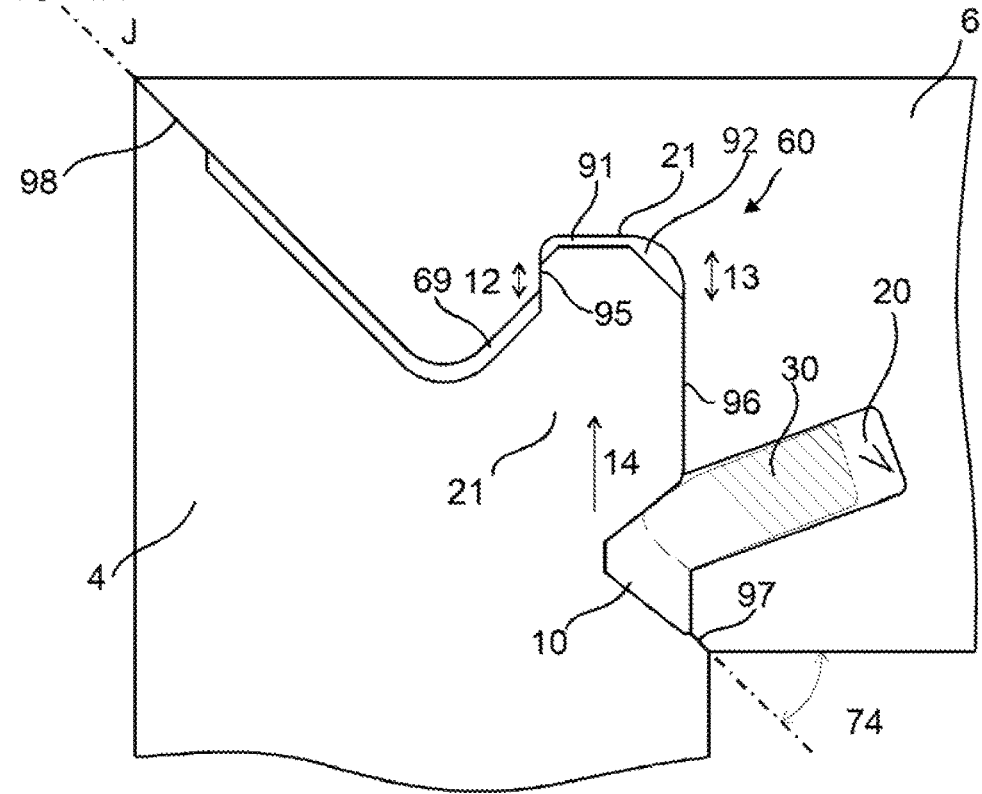
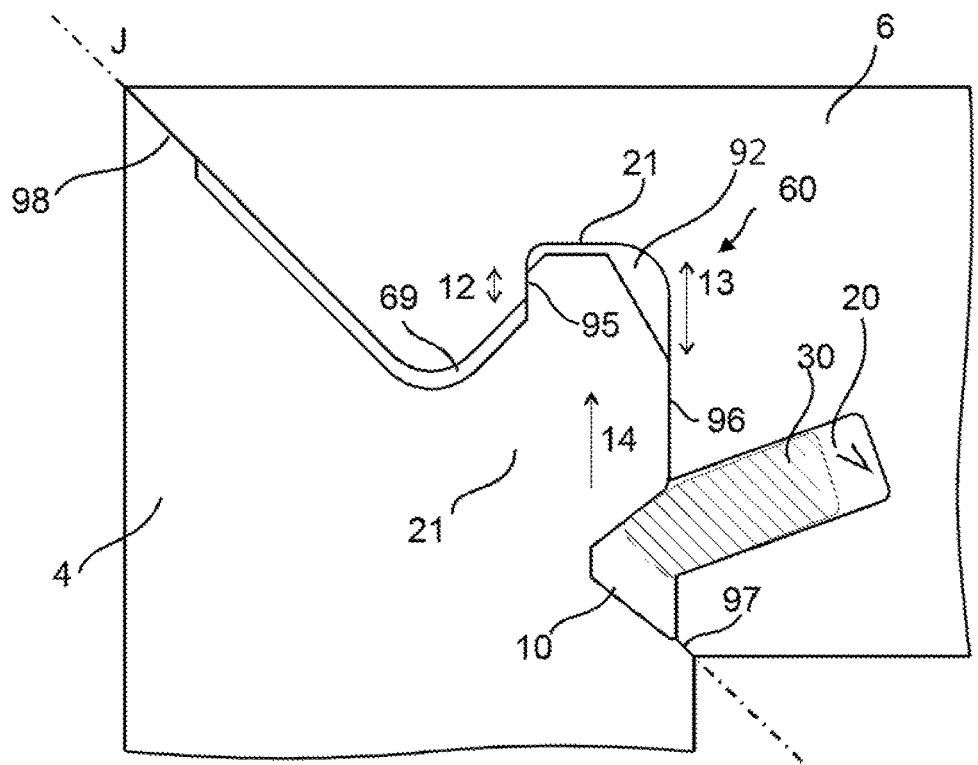

PANELS COMPRISING A MECHANICAL LOCKING DEVICE AND AN ASSEMBLED PRODUCT COMPRISING THE PANELS

CROSS REFERENCE TO RELATED APPLICATIONS

The present application claims the benefit of Swedish Application No. 1551211-4, filed on Sep. 22, 2015. The entire contents of Swedish Application No. 1551211-4 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

SUMMARY

One object of certain embodiments of the present invention to provide an improvement over the above described technique and the known art. A specific objective is to improve disassembling of a mechanical locking of an assembled product, such as a furniture, a furniture component, a drawer, a cupboard, a bookshelf, a wardrobe, a kitchen fixture, or a box for storing or transporting.

A further object of embodiments of the invention is to provide an improved method to disassemble a furniture product comprising a frame and a back piece.

At least some of these and other objects and advantages that will be apparent from the description have been achieved by a first aspect of the invention that includes a set of panels, preferably for a furniture product, comprising a panel with a first main plane and an adjacent panel with a second main plane, wherein the panel and the adjacent panel comprising an angleable locking device for locking a first edge of the panel to a second edge of the adjacent panel, wherein the first main plane is essentially perpendicular to the second main plane. The angleable locking device comprises an edge groove at the first edge and a tongue groove at the second edge, the edge groove comprises a flexible tongue arranged in an insertion groove at a first side of the edge groove, said flexible tongue is configured to cooperate with the tongue groove for locking together the first and the second edges in a first direction which is perpendicular to the first main plane. The angleable locking device further comprises contact surfaces between the edge groove and the second edge at the first side and at a second side, respectively, of the edge groove for locking together the first and the second edges in a second direction which is parallel to the first main plane.

The angleable locking device is configured to be unlocked by an angling motion of the panel relative the adjacent panel, such that an angle between the first and the second main plane increases. This may facilitate disassembling of the panel and the adjacent panel since the angleable locking device may be unlocked without a tool.

The flexible tongue may facilitate assembling by a linear displacement of the panel relative the adjacent panel in a direction essentially perpendicular to the first main plane.

The panel is preferably frame panel and the adjacent panel is preferably a back piece panel.

The angleable locking device is preferably configured such that the flexible tongue moves out of the tongue groove by the angling motion.

The angleable locking device may comprise a first space between the first edge and the second edge at a second side of an opening of the edge groove in a locked position of the panel and the adjacent panel. The first space is preferably at an outer edge surface at an outer corner of the panel and the adjacent panel in a locked position.

The angleable locking device may comprise cooperating surfaces at a first side of the opening of the edge groove in a locked position of the panel and the adjacent panel, preferably at an inner corner of the panel and the adjacent panel.

The angleable locking device may comprise a recess, such as a bevel, at the first edge, to obtain said first space.

The angleable locking device may comprise a recess at the second edge to obtain said first space.

The angleable locking device may comprise a recess, such as a bevel, at a first and/or a second outer edge for enabling said angling motion.

The angleable locking device may comprise a second space between an outer edge of the second edge and the edge groove at the first side of the edge groove for enabling said angling motion. The second space preferably extends a distance which is about the same or greater than a length of the contact surface between the edge groove and the second edge at the second side of the edge groove, in a depth direction of the edge groove. The distance may be shorter than two or three times the length of the contact surface between the edge groove and the second edge.

The edge groove may extend along essentially the entire length of the second edge.

The flexible tongue may be displaceable in the insertion groove.

The angleable locking device may comprise a third space between an outermost surface of the second edge and the edge groove.

The angleable locking device may comprise cooperating surfaces at the second side of an opening of the edge groove, preferably at an outer edge surface at an outer corner of the panel and the adjacent panel in a locked position. This may provide a tight joint or a joint without visible gaps.

The angleable locking device may comprise a bottom part of the panel at a bottom of the edge groove and a side part, wherein the bottom part is bendable such that the side part is displaceable and/or angleable for enabling said angling motion.

The angleable locking device may comprise a bevel or rounding at an opening of the tongue groove. The flexible tongue may easier slide out from the tongue groove due to said rounding or bevel.

The second edge and the edge groove may comprise cooperating surfaces at the first side of the edge groove, preferably between the insertion groove and a bottom surface of the edge groove, for positioning of the edge relative the edge groove in the depth direction. The cooperating surfaces may be between a first surface of a recess at the second edge and a second surface of a recess at the edge groove.

The insertion groove may extend along essentially the entire length of the edge groove.

The flexible tongue is preferably displaceable in the insertion groove.

Some or all features that facilitate unlocking by an angling motion may be combined in one embodiment to improve the unlocking.

The flexible tongue may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

A core material of the panel and/or the adjacent panel may comprise a wood fibre based board, such as a HDF, MDF, plywood, solid wood or particleboard, or a reinforced plastic board or a wood fibre composite board.

The core may be provided with a decorative layer.

A second aspect of the invention is an assembled furniture product comprising a frame and a back piece, wherein the frame comprises panels, wherein a first and a second corner of the frame each comprises a corner locking device for locking two adjacent panels to each other, said corner locking device comprising a flexible tongue, wherein the corner locking device is un-lockable by displacing and/or compressing the flexible tongue by a tool. The back piece is connected to the frame by the angleable locking device according to the first aspect. The back piece may comprise four edges. A third and a fourth corner of the frame may each comprises a corner locking device for locking two adjacent panels to each other, said corner locking device comprising a flexible tongue, wherein the corner locking device is un-lockable by displacing and/or compressing the flexible tongue by a tool. The back piece is, in a preferred embodiment of the assembled furniture product, connected at four edges to the frame. Each edge is preferably connected by the angleable locking device according to the first aspect.

A third aspect of the invention is a method for disassembling a furniture product comprising a frame and a back piece, wherein the method comprises:
 un-locking a first and a second corner locking device, at a first edge and at a second edge of a top panel, respectively, by displacing and/or compressing a flexible tongue of the first and of the second corner locking device, respectively,
 angling up the top panel by an angling motion, and
 unlocking by said angling motion a back piece connected to the top panel by an angleable locking device, and removing the top panel.

The method may comprise:
 rotating the furniture, preferably such that a bottom panel of the furniture product is at the top,
 un-locking a third and a fourth corner locking device, at a third edge and at a fourth edge of a bottom panel, respectively, by displacing and/or compressing a flexible tongue of the third and of the fourth corner locking device, respectively,
 angling up the bottom panel by an angling motion, and
 unlocking by said angling motion the back piece connected to the bottom panel by an angleable locking device, and removing the bottom panel.

The method may comprise unlocking a first side panel and a second side panel of the frame. The first side panel may be unlocked by an angling motion or a sliding motion of the first panel relative the back piece. The second side panel may be unlocked by an angling motion or a sliding motion of the second panel relative the back piece. The first side panel may alternative be unlocked by displacing and/or compressing a flexible tongue of a locking device at a joint between the first side panel and the back piece. The second side panel may alternative be unlocked by displacing and/or compressing a flexible tongue of a locking device at a joint between the second side panel and the back piece.

BRIEF DESCRIPTION OF THE DRAWINGS

Embodiments of the present invention will by way of example be described in more detail with reference to the appended schematic drawings, in which:

FIG. 10 shows an enlargement of an embodiment of the angleable locking device.

FIGS. 11A-11B show enlargements of embodiments of the angleable locking device.

DETAILED DESCRIPTION

Figure 1A:
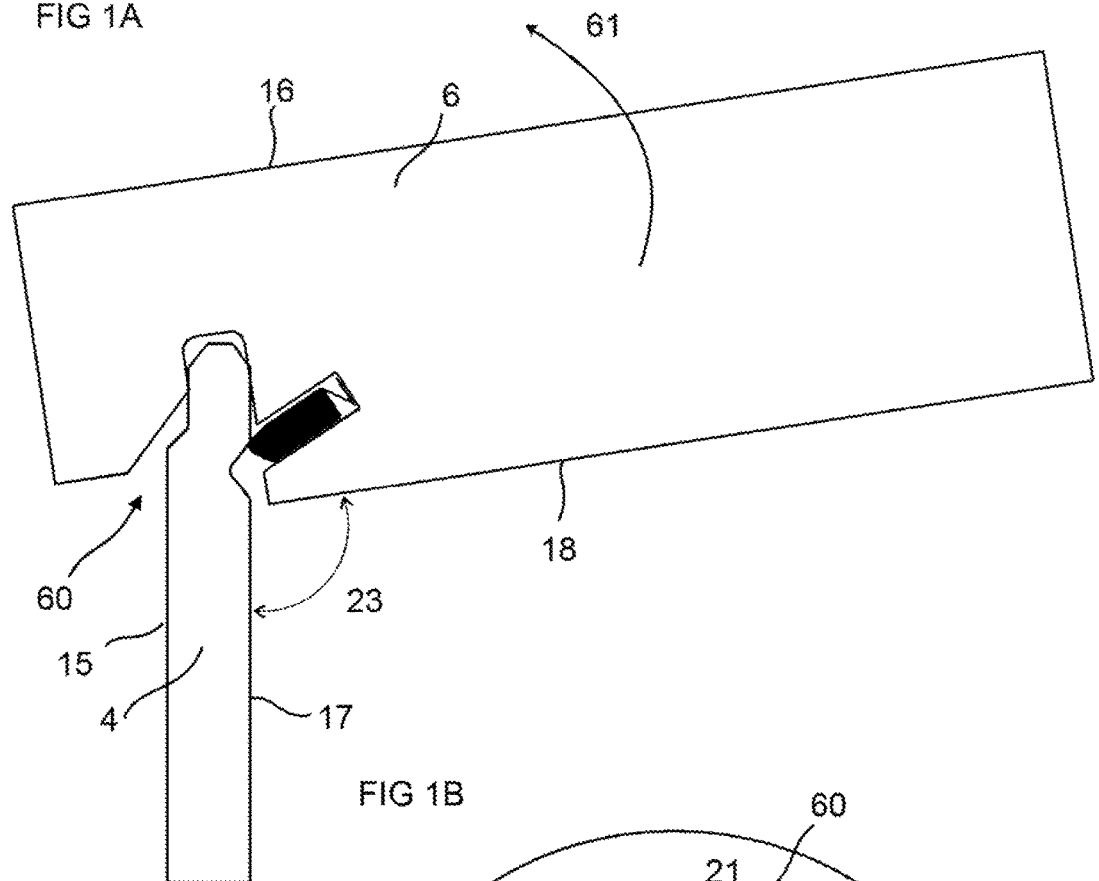
FIGS. 1A-1B show panels provided with an angleable locking device according to an embodiment of the invention.

FIG. 1A shows a disassembling of a panel 6 from an adjacent panel 4. The panel 6 and the adjacent panel 4 are provided with an embodiment of an angleable locking device 60. The panel 6 may be a top panel of a frame, such as a frame for a furniture product, and the adjacent 4 panel may be a back piece configured to be connected to the top panel.

Figure 1B:
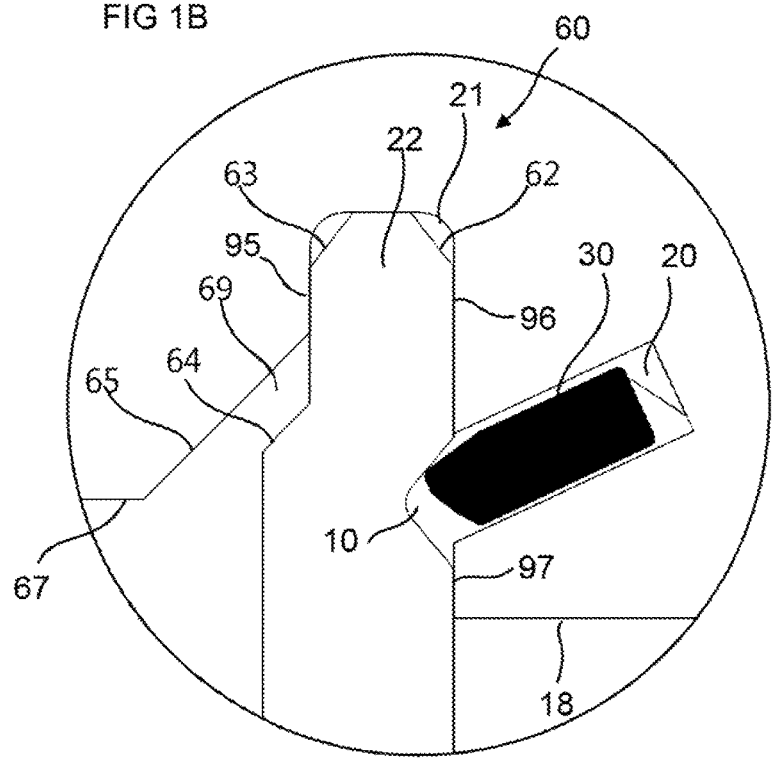

FIG. 1B shows an enlarged view of the angleable locking device 60 in a locked position of the panel and the adjacent panel. The panel 6 has a first main plane and an adjacent panel 4 has a second main plane. The first main plane is essentially perpendicular to the second main plane in the locked position. The angleable locking device 60 is configured for locking a first edge of the panel 6 to a second edge 22 of the adjacent panel 4. The angleable locking device comprises an edge groove 21 at the first edge and a tongue groove 10 at the second edge. The edge groove 21 comprises a flexible tongue 30 arranged in an insertion groove 20 at a first side of the edge groove 21, said flexible tongue is configured to cooperate with the tongue groove 10 for locking together the first and the second edges in a first direction which is perpendicular to the first main plane.

The angleable locking device 60 further comprises contact surfaces 96, 95, between the edge groove 21 and the second edge 22 at the first side and at a second side, respectively, of the edge groove 21 for locking together the first and the second edges in a second direction which is parallel to the first main plane. The angleable locking device 60 is configured to be unlocked by an angling motion 61 of the panel 6 relative the adjacent panel 4, such that an angle 23 between the first and the second main plane increases.

The panel 6 and the adjacent panel 4 each preferably comprises four edges, an outer surface 16,15 and an inner surface 18,17. The first main plane is parallel to the outer surface 16 of the panel and the second main plane is parallel to the outer surface 15 of the adjacent panel.

The outer and/or the inner surfaces may comprise a decorative layer (not shown).

The angleable locking device 60 is preferably configured such that the flexible tongue 30 moves out of the tongue groove 10 by the angling motion 61. Part(s) of the panel, the adjacent panel, and/or the angleable locking device may be compressed during the angling motion. The angleable locking device may comprise a first space 69 between the first edge and the second edge 22 at a second side of an opening of the edge groove 21 in a locked position of the panel and the adjacent panel. The angleable locking device may comprise a recess 65, such as a bevel, at the first edge and/or a recess 64 at the second edge, to obtain said first space. A first and/or a second outer edge of the adjacent panel 4 may be provided with a recess 63,62, such as a bevel, for enabling said angling motion 61. A space is preferably obtained by each said recess.

The angleable locking device may comprise cooperating surfaces 97 at a first side of the opening of the edge groove 21 in a locked position of the panel 6 and the adjacent panel 4, preferably at an inner corner of the panel and the adjacent panel.

The edge groove 21 preferably extends along essentially the entire length of the second edge.

The flexible tongue 30 is preferably displaceable in the insertion groove 20. The tongue and the insertion groove may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

Figure 2A:
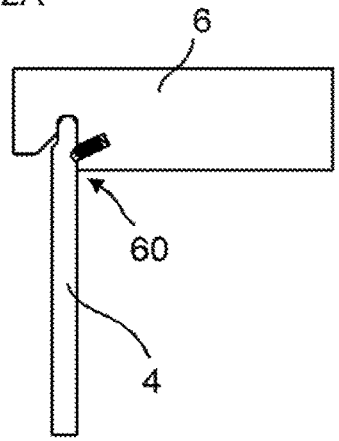
FIGS. 2A-2C show an embodiment of a method to disassemble an embodiment of the present invention.
Figure 2D:
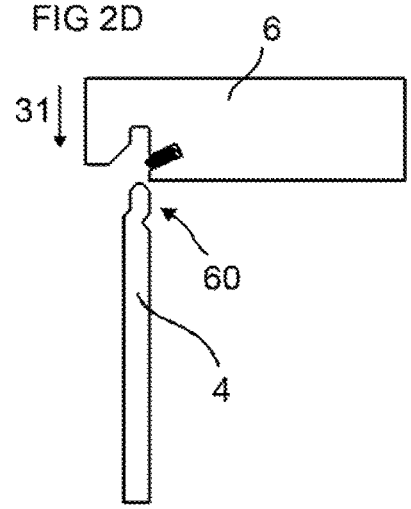
FIGS. 2D-2F show an embodiment of a method to assemble the embodiment shown in FIGS. 2A-2C.
Figure 2B:
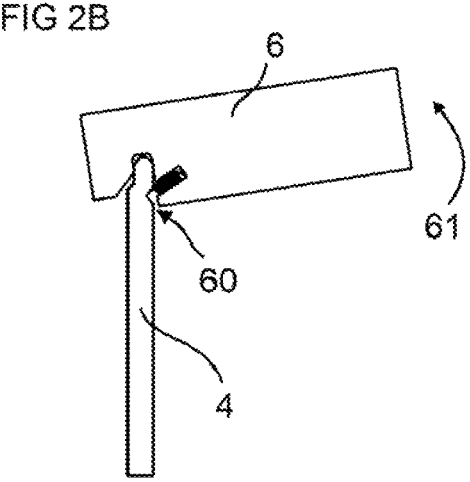
Figure 2E:
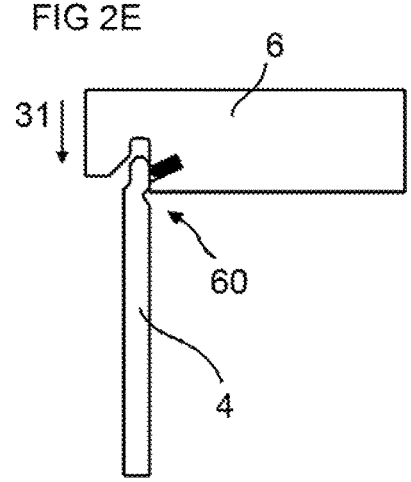
Figure 2C:
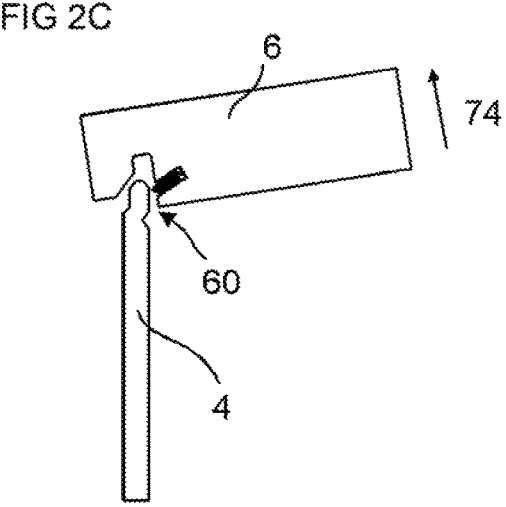
Figure 2F:
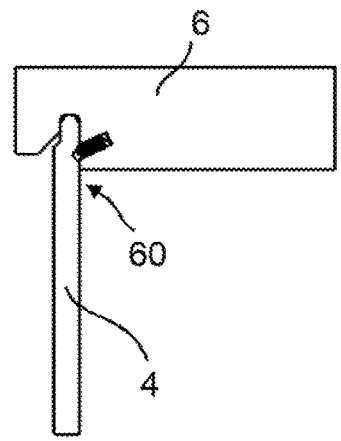

In the present disclosure, FIGS. 2A-2C show an embodiment of a method to disassemble and FIG. 2D-2F a method to assemble an embodiment of the panel 6 and the adjacent panel 4 described above. FIG. 2A shows the panel 6 and the adjacent panel 4 in a locked position. FIG. 2B shows that the panel 6 is angled upwards by an angling motion 61, wherein an angle between the panel and the adjacent panel is increased and the flexible tongue moves out of the tongue groove 10. FIG. 2C shows a displacement 74 of the panel in a direction which may be diagonally upward. The angle of the displacement depends on the configuration of the angleable locking device. The displacement and the angling motion may be performed simultaneous. FIG. 2D shows that the panel 6 is displaced 31 relative the adjacent panel in a direction which is essentially parallel to the second main plane. FIG. 2E shows that flexible tongue is displaced and compressed into the insertion groove. The flexible tongue springs at least partly back when the panel 6 and the adjacent panel 4 has reached a final locked position, as shown in FIG. 2F. The panel 6 and adjacent panel 4 could also be assembled by reversing the movements shown in FIGS. 2A-2C.

Figure 3:
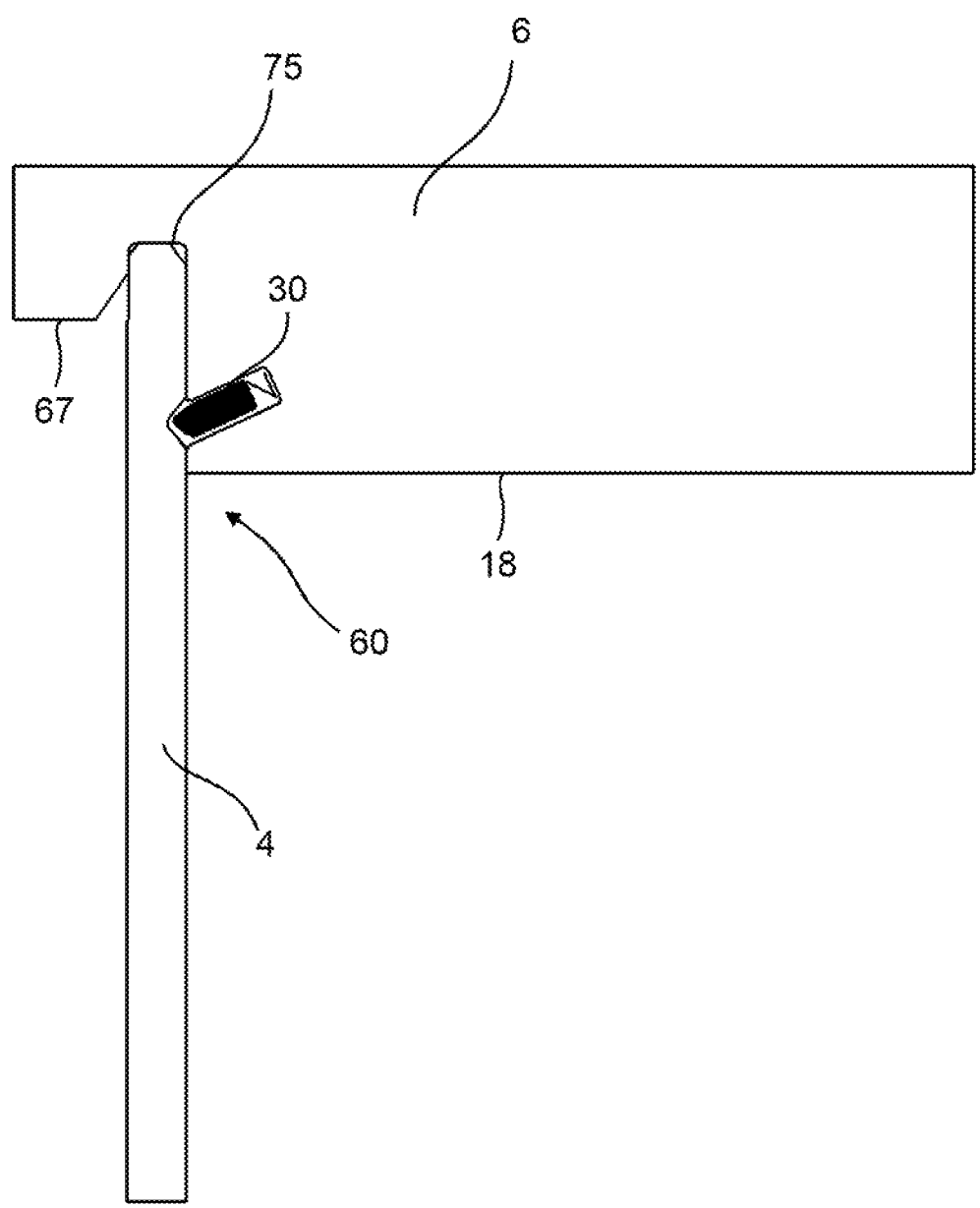
FIG. 3 shows an embodiment of the angleable locking device according to the invention.

FIG. 3 shows an embodiment of the angleable locking device comprising an outer edge surface 67 adjacent the edge groove. The outer edge surface of this embodiment is closer to a bottom 75 of the edge groove 21 and the second wall of the edge groove is shorter as compared to the embodiment shown in FIGS. 1A-1B. The outer edge surface is facing the adjacent panel. An advantage may be that the adjacent panel is easier to disassemble by said angling motion.

Figure 4A:
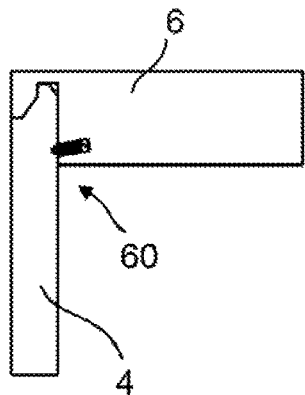
FIGS. 4A-4C show an embodiment of a method to disassemble an embodiment of the present invention.
Figure 4D:
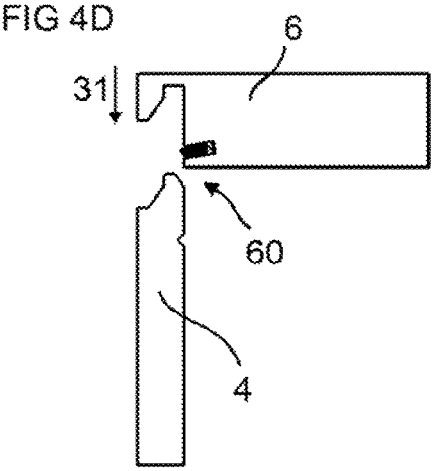
FIGS. 4D-4F show an embodiment of a method to assemble the embodiment shown in FIGS. 4A-4C.
Figure 4B:
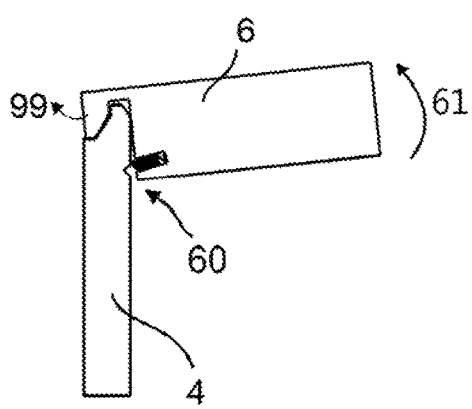
Figure 4E:
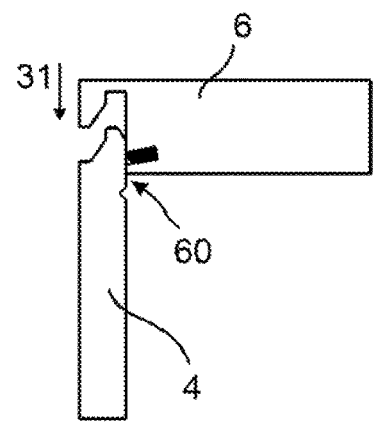
Figure 4C:
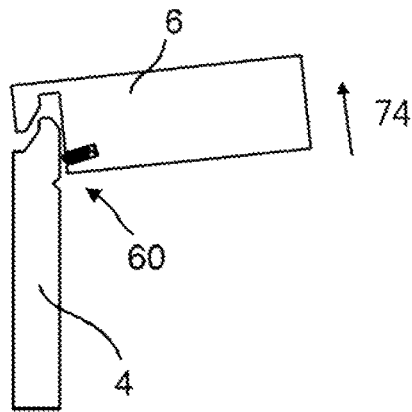
Figure 4F:
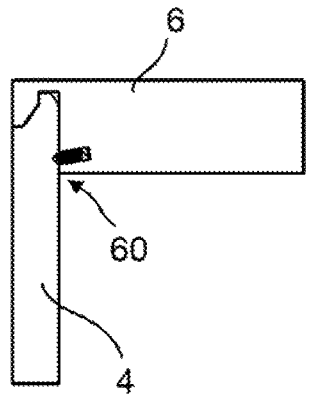

FIGS. 4A-4C show an embodiment of a method to disassemble and FIG. 4D-4F a method to assemble an embodiment of the panel 6 and the adjacent panel 4 that comprises the angleable locking device show in FIG. 9A and described below. A difference to the method shown in FIG. 2A-2F is that a bottom part at the edge groove is bendable such that a side part of the edge groove is displaceable 99 during the angling motion 61. The side part of the edge groove may bend up to 25°, preferably up to 15°, preferably 1-10°. The panel 6 and adjacent panel 4 could also be assembled by reversing the movements shown in FIGS. 2A-2C.

Figure 5A:
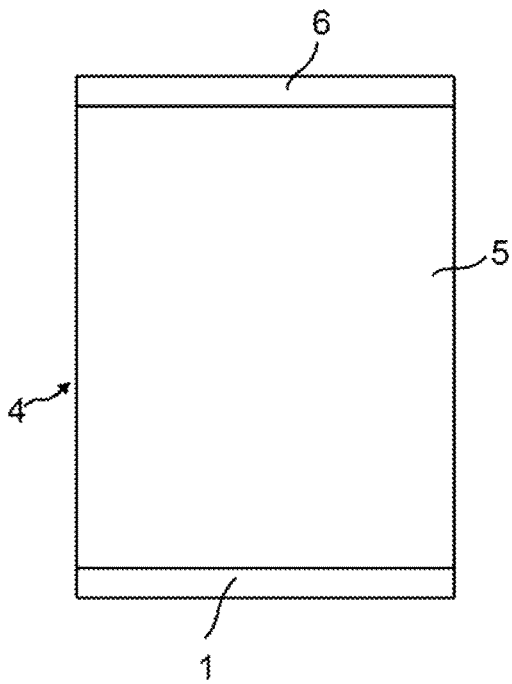
FIGS. 5A-5B show an embodiment of an assembled product in a side view and a bottom view, respectively, of the present invention.
Figure 5C:
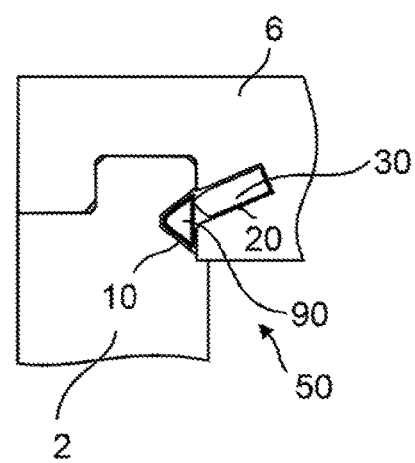
FIG. 5C shows an embodiment of a frame joint during unlocking according to an embodiment of the invention.
Figure 5B:
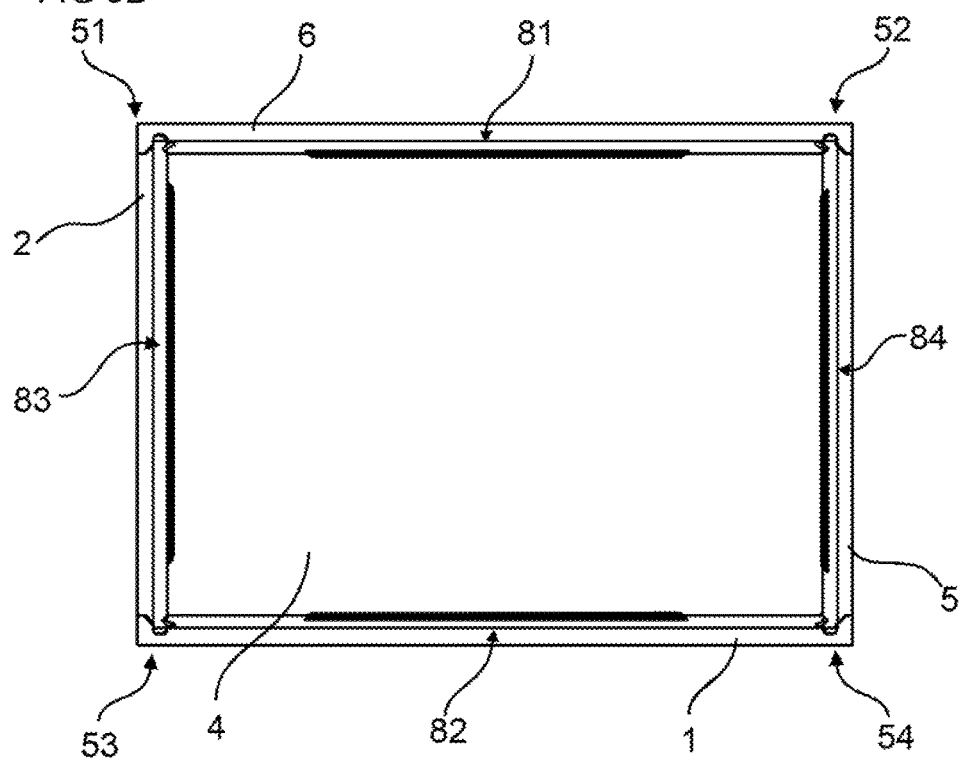
Figure 7A:
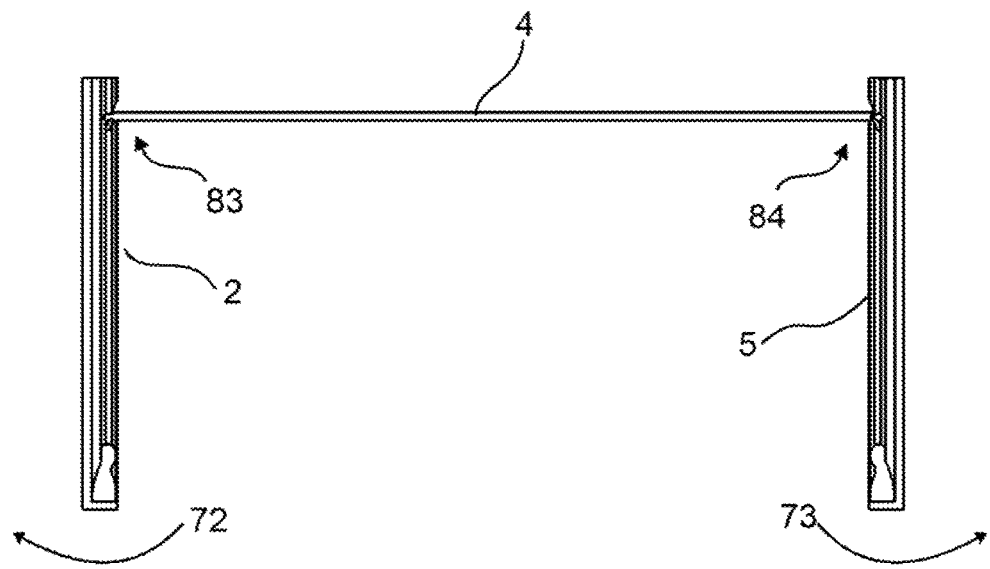
FIG. 7A shows an embodiment of a method to disassemble the embodiment shown in FIGS. 6A-6D.
Figure 8A:
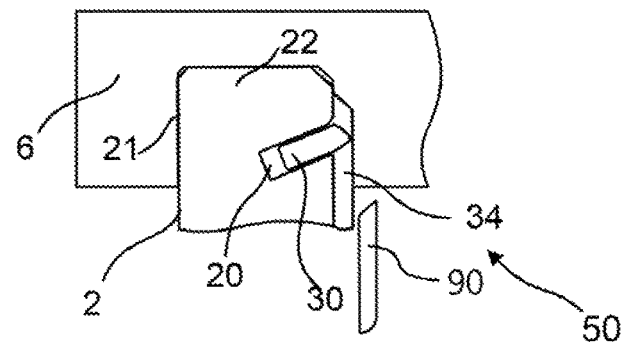
FIGS. 8A-8B show embodiments of frame joint during unlocking as a part of an embodiment of the invention.
Figure 8B:
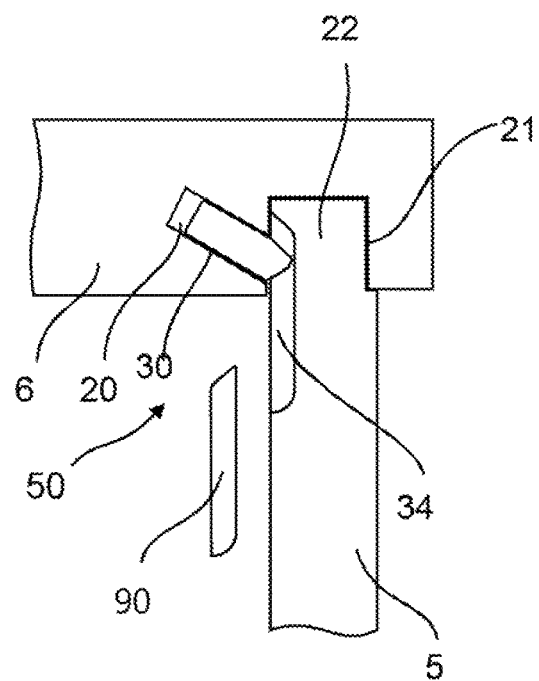

FIGS. 5A-5B show an assembled furniture product comprising a frame and a back piece 4. The frame comprises four frame panels 1,2,5,6, e.g. a top panel 6, a bottom panel 1, a first and a second side panel 2, 5. FIG. 5A shows the assembled product from a side view and FIG. 5B shows the assembled product from a back view. A first and a second corner edge 51, 52 of the frame each comprises a corner locking device 50 for locking two adjacent frame panels to each other. Said corner locking device comprising a flexible tongue 30, wherein the corner locking device is un-lockable by displacing and/or compressing the flexible tongue by a tool 90 as is shown in FIG. 5C. Alternative embodiments of said corner locking device is shown in FIG. 8A-8B. These corner locking devices are described and shown in FIG. 7D-7E in WO2015/038059(A1). FIGS. 7D-7E and the related disclosure at page 12, lines 10-26, in WO2015/038059 are hereby expressly incorporated by reference herein.

A third and a fourth corner edge 53, 54 of the frame each preferably comprises a corner locking device 50 for locking two adjacent frame panels to each other. The back piece 4 is connected to the frame by an embodiment of the angleable locking device 60 as disclosed above. The back piece 4 may comprise four edges. The back piece is in a preferred embodiment of the assembled furniture product connected at four edges 81, 82, 83, 84 to the frame. Each edge is preferably connected by an embodiment of said angleable locking device 60 as disclosed above.

Figure 6A:
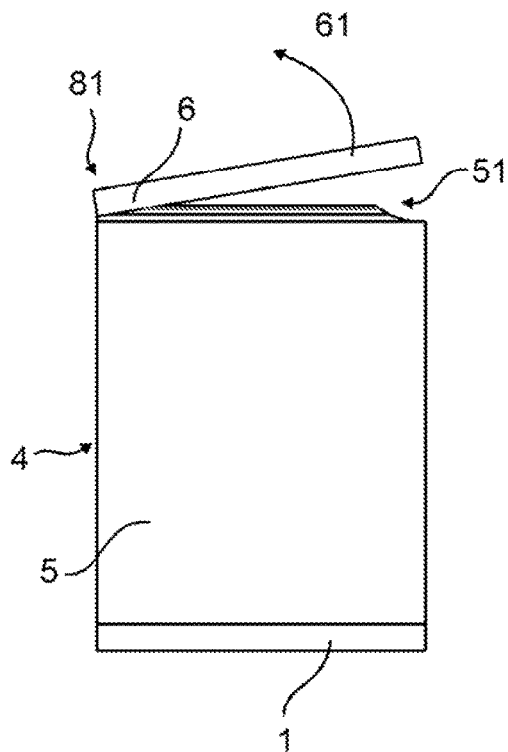
FIGS. 6A-6D show an embodiment of a method to disassemble an embodiment of the present invention.
Figure 6B:
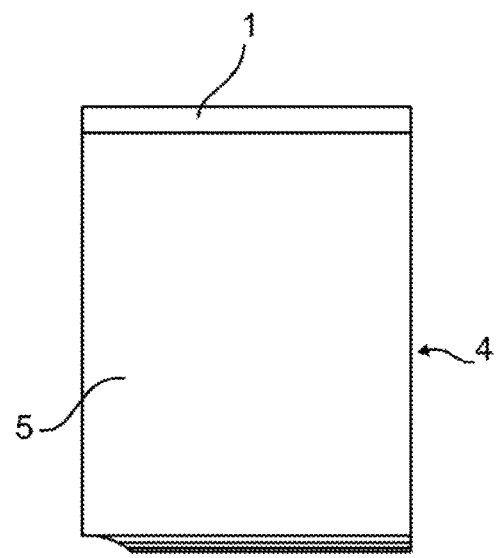
Figure 6C:
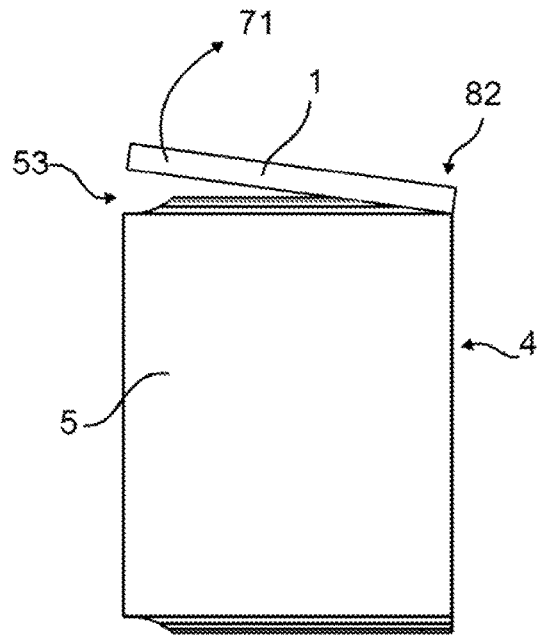
Figure 6D:
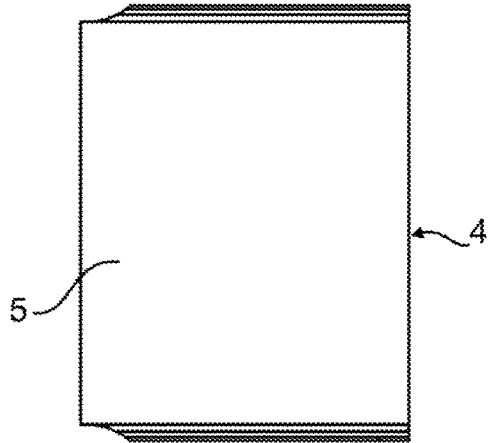

FIGS. 6A-6D and FIG. 7A show an embodiment of a method for disassembling a furniture product comprising a frame and a back piece, such as the furniture product shown in FIG. 5A-5C. The furniture product is in FIGS. 6A-6D shown in a side view and in FIG. 7A in a top view. An un-locking of a first and a second corner locking device 50, at a first corner edge 51 and at a second corner edge 52 of a top panel 6, respectively, by displacing and/or compressing a flexible tongue of the first and of the second corner locking device, see e.g. FIG. 5C, respectively, and angling up the top panel by angling motion 61, is shown in FIG. 6A. A back piece connected to the top panel 6 by an angleable locking device 81 is unlocked by said angling motion. The top panel 6 is thereafter removed. FIG. 6B shows that the furniture product is rotated such that a bottom panel 1 of the furniture product is at the top. An un-locking of a third and a fourth corner locking device 50, at a third corner edge 53 and at a fourth corner edge 54 of a bottom panel 1, respectively, by displacing and/or compressing a flexible tongue 50 of the third and of the fourth corner locking device, respectively, and an angling up of the bottom panel 1 by an angling motion 71, is shown in FIG. 6C. The back piece 4 connected to the bottom panel by an angleable locking device 82 is unlocked by said angling motion 71. The bottom panel 1 is thereafter removed, see FIG. 6D.

The method may comprise unlocking a first side 2 panel and a second side panel 5 of the frame. The first side panel may be unlocked by an angling 72 motion or a sliding motion of the first panel relative the back piece. The second side panel may be unlocked by an angling motion 73 or a sliding motion of the second panel relative the back piece.

Figure 7B:
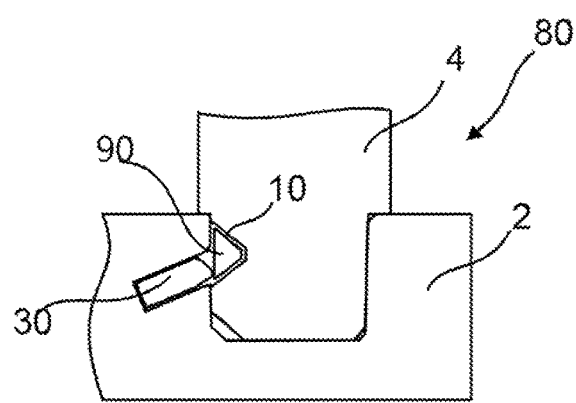
FIGS. 7B-7C embodiments of a back piece joint during unlocking as a part of an embodiment of the invention.
Figure 7C:
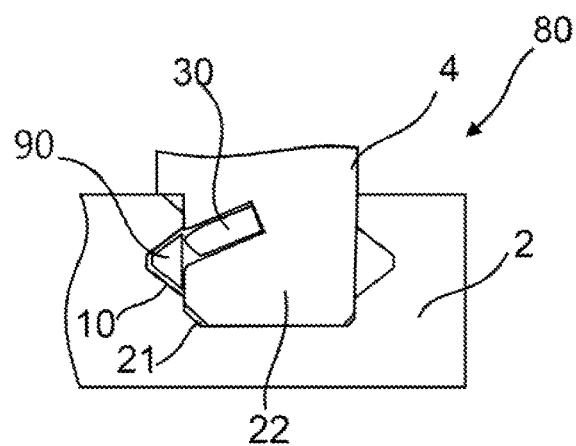
Figure 8C:
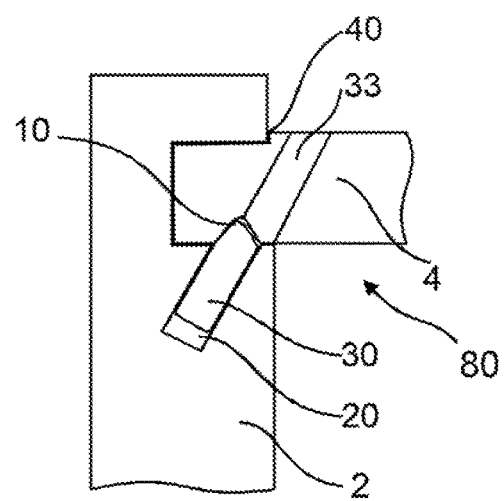
FIG. 8C shows an embodiment of a back piece joint during unlocking as a part of an embodiment of the invention.

The first side panel may alternative be unlocked by displacing and/or compressing a flexible tongue 30 by a tool of a locking device 80 at a joint between the first side panel and the back piece. The second side panel may alternative be unlocked by displacing and/or compressing a flexible tongue 30 by a tool 90 of a locking device 80 at a joint between the second side panel 5 and the back piece 4. The first side panel and the second side panel may for these alternatives be connected by e.g. a locking device configured as shown in FIG. 7B, FIG. 7C or FIG. 8C during unlocking by a tool 90. These locking devices are described and shown in FIG. 2C and FIG. 7B-7C in WO2015038059(A1). FIGS. 2C and 7B-7C and the related disclosure at page 8, line 33 to page 9, line 3 and page 12, lines 7-8, in WO2015/038059 are hereby expressly incorporated by reference herein.

Figure 9A:
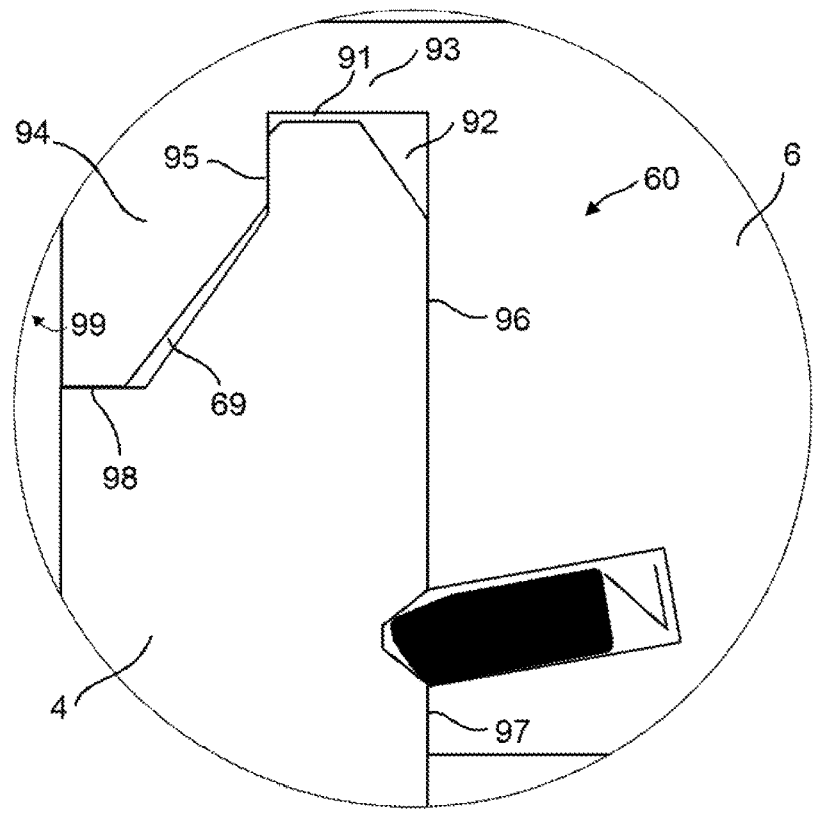
FIG. 9A shows an enlargement of the embodiments shown in FIGS. 4A-4F.

FIG. 9A shows an enlarged view of the embodiment of the angleable locking device 60 shown in FIG. 4A-4F, in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The angleable locking device may comprise cooperating surfaces 98 at the second side of the opening of the edge groove 21, preferably at an outer edge surface at an outer corner of the panel and the adjacent panel in a locked position. The cooperating surfaces 98 may hide the locking system and improve the appearance. A bottom part 93 of the panel at a bottom of the edge groove and a side part 94 may be bendable such that a side part is displaceable 99 for enabling said angling motion 61. The side part of the edge groove may bend up to 25°, preferably up to 15°, preferably 1-10°. The edge groove may become wider by a displacement of said side part. For example, at the opening of the edge groove, the width may become wider by 5 to 30%, preferably 5 to 10%.

Figure 9B:
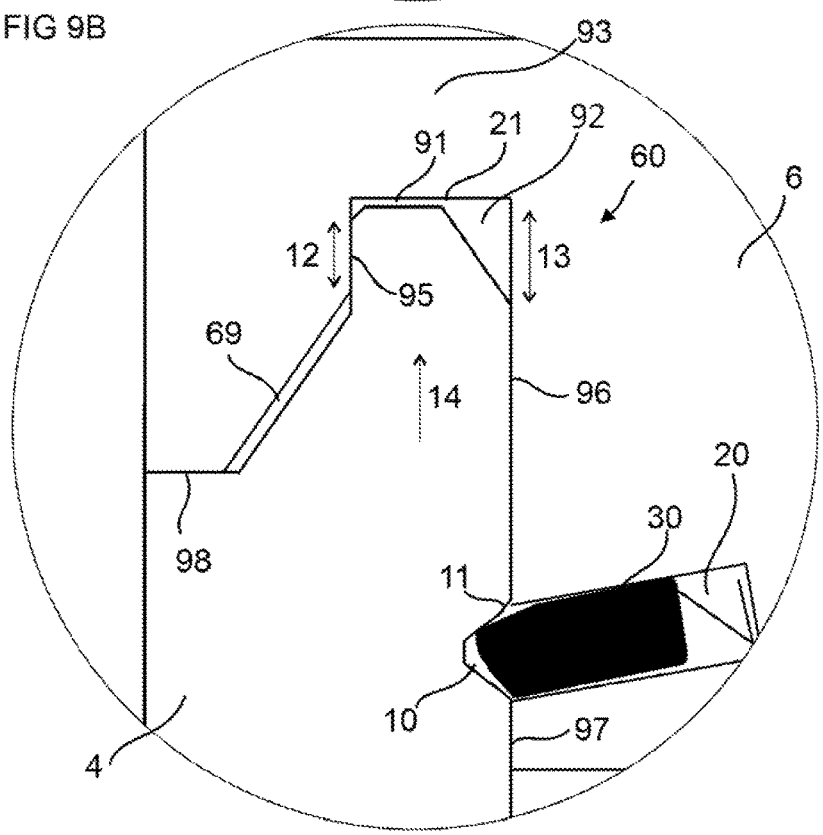
FIG. 9B shows an enlargement of an embodiment of the angleable locking device.

FIG. 9B shows an enlarged view of an embodiment of the angleable locking device 60 in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The second space 92 preferably extends a distance 13 which is about the same or greater than a length 12 of the contact surfaces 95 between the edge groove 21 and the second edge 22 at the second side of the edge groove, in a depth direction 14 of the edge groove which is preferably perpendicular to the first main plane. Distance 13 is measured from a plane at the outermost surface of the second edge 22 to the start of the contact surfaces 96. The distance 13 may range in size from the length 12 of the contact surfaces between the edge groove and the second edge to a size of three times the length 12, optionally 1.1 times to two times the length 12. The angleable locking device may comprise cooperating surfaces 98 at the second side of the opening of the edge groove 21, preferably at an outer edge surface at an outer corner of the panel and the adjacent panel in a locked position. The cooperating surfaces may hide the locking system and improve the appearance.

FIG. 10 shows an enlarged view of an embodiment of the angleable locking device 60 in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The second space 92 preferably extends a distance 13 which is about the same or greater than a length 12 of the contact surfaces 95 between the edge groove 21 and the second edge 22 at the second side of the edge groove, in a depth direction 14 of the edge groove which is preferably perpendicular to the first main plane. The distance 13 may range in size from the length 12 of the contact surfaces between the edge groove and the second edge to a size of three times the length 12, optionally 1.1 times to two times the length 12. The second edge 22 and the edge groove 21 of the embodiment comprises cooperating surfaces 77 at the first side of the edge groove, preferably between the insertion groove 20 and a bottom surface of the edge groove, for positioning of the second edge 22 relative the edge groove 21 in the depth direction 14. The cooperating surfaces may be between a first surface of a recess 75 at the second edge 22 and a second surface of a recess 76 at the edge groove 21.

FIG. 11A-11B show an enlarged views of embodiments of the angleable locking device 60 in a locked position of the panel and the adjacent panel. The first main plane is essentially perpendicular to the second main plane and panel and the adjacent panel are joined at a junction plane which is extending between the first main plane and the second main plane. An angle between the junction plane and the first main plane may be of about 45°, optionally between 15↑8 and 75°, or between 30° and 60°. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The embodiment may comprise cooperating surfaces 97 at the first side of the opening of the edge groove 21 in a locked position of the panel 6 and the adjacent panel 4, preferably at an inner corner of the panel and the adjacent panel. The embodiment may further comprise cooperating surfaces 98 at the second side of the opening of the edge groove 21, preferably at an outer edge surface at an outer corner of the panel and the adjacent panel in a locked position The second space 92 shown in FIG. 11A extends a distance 13, which is about the same as a length 12 of the contact surfaces 95 between the edge groove 21 and the second edge 22 at the second side of the edge groove, in a depth direction 14 of the edge groove which is preferably perpendicular to the first main plane.

The second space 92 shown in FIG. 11B extends a distance 13, which is about three times the length 12 of the contact surfaces 95 between the edge groove 21 and the second edge 22 at the second side of the edge groove, in a depth direction 14 of the edge groove which is preferably perpendicular to the first main plane.

The second space 92, which extend a shorter distance, shown in FIG. 11A may provide a stronger locking and the second space 92, which extend a longer distance, shown in FIG. 11B may facilitate unlocking by said angling motion.

The distance 13 may be in the range of about one time to about three times the length 12 of the contact surfaces 95 between the edge groove and the second edge.

Embodiments of the angleable locking device may comprise a bevel or rounding 11 at an opening of the tongue groove 10. An advantage of the bevel or the rounding 11 may be that the flexible tongue 30 easier slides out of the tongue groove 10 during unlocking by said angling motion. The bevel or rounding may be quite small and produced by cutting or sanding.

A core material of the panels in the embodiments above preferably comprises a wood fibre based board, such as a HDF, MDF, plywood, solid wood or particleboard, a reinforced plastic board, or a wood fibre composite board.

EMBODIMENTS

1. A set of panels, preferably for a furniture product, comprising a panel (6) with a first main plane and an adjacent panel (4) with a second main plane, wherein the panel and the adjacent panel comprise an angleable locking device (60) for locking a first edge of the panel (6) to a second edge (22) of the adjacent panel (4), wherein the first main plane is essentially perpendicular to the second main plane, characterized in:
   that the angleable locking device comprises an edge groove (21) at the first edge and a tongue groove (10) at the second edge (22), the edge groove (21) comprises a flexible tongue (30) arranged in an insertion groove (20) at a first side of the edge groove (21), said flexible tongue is configured to cooperate with the tongue groove (10) for locking together the first and the second edges in a first direction which is perpendicular to the first main plane,
   that the angleable locking device further comprises contact surfaces (96, 95) between the edge groove (21) and the second edge (22) at the first side and at a second side, respectively, of the edge groove (21) for locking together the first and the second edges in a second direction which is parallel to the first main plane, and
   that the angleable locking device is configured to be unlocked by an angling motion (61) of the panel (6) relative the adjacent panel (4), such that an angle between the first and the second main plane increases.
2. The set of panels as in embodiment 1, wherein the angleable locking device is configured such that the flexible tongue (30) moves out of the tongue groove (10) by the angling motion (61).
3. The set of panels as in embodiment 1, wherein the angleable locking device comprises a first space (69) between the first edge and the second edge (22) at a second side of an opening of the edge groove (21) in a locked position of the panel and the adjacent panel.
4. The set of panels as in embodiment 3, wherein the angleable locking device comprises cooperating surfaces (97) at a first side of the opening of the edge groove (21) in a locked position of the panel (6) and the adjacent panel (4), preferably at an inner corner of the panel and the adjacent panel.
5. The set of panels as in embodiment 3 or 4, wherein the angleable locking device comprises a recess (65), such as a bevel, at the first edge, to obtain said first space.
6. The set of panels as in embodiments 3-5, wherein the angleable locking device comprises a recess (64) at the second edge (22) to obtain said first space.
7. The set of panels as in embodiments 3-5, wherein the angleable locking device comprises a recess (63,62), such as a bevel, at a first and/or a second outer edge for enabling said angling motion (61).
8. The set of panels as in any one of the preceding embodiments, wherein the angleable locking device comprises a second space (92) between an outer edge of the second edge (22) and the edge groove (21) at the first side of the edge groove (21) for enabling said angling motion (61).
9. The set of panels as in any one of the preceding embodiments, wherein the edge groove (21) extends along essentially the entire length of the second edge (22).
10. The set of panels as in any one of the preceding embodiments, wherein the flexible tongue (30) is displaceable in the insertion groove (20).
11. The set of panels as in any one of the preceding embodiments, wherein the angleable locking device comprises a third space (91) between an outermost surface of the second edge (22) and the edge groove (21).
12. The set of panels as in any one of the preceding embodiments, wherein the angleable locking device comprises cooperating surfaces (98) at the second side of an opening of the edge groove (21), preferably at an outer edge surface at an outer corner of the panel and the adjacent panel in a locked position.
13. The set of panels as in any one of the preceding embodiments, wherein the angleable locking device comprises a bottom part (93) of the panel at a bottom of the edge groove and a side part (94), wherein the bottom part is bendable such that the side part is displaceable for enabling said angling motion (61).
14. The set of panels as in any one of the preceding embodiments, wherein the angleable locking device comprises a bevel or rounding (11) at an opening of the tongue groove (10).
15. The set of panels as in any one of the preceding embodiments, wherein the second edge (22) and the edge groove (21) comprise cooperating surfaces (77) at the first side of the edge groove (21), preferably between the insertion groove (20) and a bottom surface of the edge groove (21), for positioning of the second edge (22) relative the edge groove in a depth direction (14) of the edge groove (21).
16. The set of panels as in embodiment 15, wherein the cooperating surfaces (77) are a first surface of a recess (75) at the second edge (22) and a second surface of a recess (76) at the edge groove (21).
17. An assembled furniture product comprising a frame and a back piece (4), wherein the frame comprises panels (1,2,5,6), wherein a first and a second corner edge (51, 52) of the frame each comprises a corner locking device (50) for locking two adjacent panels to each other, said corner locking device comprising a flexible tongue (30), wherein the corner locking device is un-lockable by displacing and/or compressing the flexible tongue by a tool (90), characterised in that the back piece (4) is connected to the frame by the angleable locking device (60) according to any one of the embodiments 1-16.

18. A method for disassembling a furniture product comprising a frame and a back piece, wherein the method comprises:
    un-locking a first and a second corner locking device (50), at a first corner edge (51) and at a second corner edge (52) of a top panel (6), respectively, by displacing and/or compressing a flexible tongue of the first and of the second corner locking device, respectively,
    angling up the top panel by an angling motion (61), and
    unlocking by said angling motion a back piece connected to the top panel by an angleable locking device (81), and removing the top panel (6).

19. The method as in embodiment 18, wherein the method comprises:
    rotating the furniture product,
    un-locking a third and a fourth corner locking device (50), at a third corner edge (53) and at a fourth corner edge (54) of a bottom panel (1), respectively, by displacing and/or compressing a flexible tongue (50) of the third and of the fourth corner locking device, respectively,
    angling up the bottom panel (1) by an angling motion (71), and
    unlocking by said angling motion (71) the back piece (4) connected to the bottom panel by an angleable locking device (82), and removing the bottom panel (1).

The invention claimed is:

1. A set of panels comprising a panel with a first main plane and an adjacent panel with a second main plane, wherein the panel and the adjacent panel comprise an angleable locking device for locking a first edge of the panel to a second edge of the adjacent panel, wherein the first main plane is essentially perpendicular to the second main plane, wherein:
    the angleable locking device comprises an edge groove at the first edge and a tongue groove at the second edge, the edge groove comprises a tongue arranged in an insertion groove at a first side of the edge groove, said tongue is configured to cooperate with the tongue groove for locking together the first and the second edges in a first direction which is perpendicular to the first main plane,
    the angleable locking device further comprises contact surfaces between the edge groove and the second edge at the first side and at a second side, respectively, of the edge groove for locking together the first and the second edges in a second direction which is parallel to the first main plane, and
    the angleable locking device is configured to be unlocked by an angling motion of the panel relative the adjacent panel, such that an angle between the first and the second main plane increases, wherein the angleable locking device is configured such that at least part of the tongue moves out of the tongue groove by the angling motion, wherein the angleable locking device comprises a first space between the first edge and the second edge at a second side of an opening of the edge groove in a locked position of the panel and the adjacent panel,
    wherein, as seen in a cross-section along a plane essentially perpendicular to the first and second main planes:
        an innermost surface of the edge groove contacts an outermost surface of the adjacent panel;
        the first space is bounded by a lateral surface of the second edge, the lateral surface of the second edge being coplanar with one of the contact surfaces; and
        the first space is bounded by only a single intersection of the panel and the adjacent panel.

2. The set of panels as claimed in claim 1, wherein the angleable locking device comprises cooperating surfaces at a first side of the opening of the edge groove in a locked position of the panel and the adjacent panel.

3. The set of panels as claimed in claim 1, wherein the angleable locking device comprises a first recessed surface at the first edge, the first recessed surface bounding said first space.

4. The set of panels as claimed in claim 3, wherein the first recessed surface is oblique relative to the first main plane.

5. The set of panels as claimed in claim 1, wherein the angleable locking device comprises a second recessed surface at the second edge the second recessed surface bounding said first space.

6. The set of panels as claimed in claim 5, wherein the second recessed surface is oblique relative to the first main plane.

7. The set of panels as claimed in claim 1, wherein the angleable locking device comprises at least one recessed surface at a first and/or a second outer edge for enabling said angling motion.

8. The set of panels as claimed in claim 1, wherein the angleable locking device comprises a second space between an outer edge of the second edge and the edge groove at the first side of the edge groove for enabling said angling motion.

9. The set of panels as claimed in claim 1, wherein the edge groove extends along essentially the entire length of the second edge.

10. The set of panels as claimed in claim 1, wherein the tongue is displaceable in the insertion groove.

11. The set of panels as claimed in claim 1, wherein the angleable locking device comprises a third space between an outermost surface of the second edge and the edge groove.

12. The set of panels as claimed in claim 1, wherein the angleable locking device comprises cooperating surfaces at the second side of an opening of the edge groove.

13. The set of panels as claimed in claim 1, wherein the angleable locking device comprises a bottom part of the panel at a bottom of the edge groove and a side part, wherein the bottom part is bendable such that the side part is displaceable for enabling said angling motion.

14. The set of panels as claimed in claim 1, wherein the angleable locking device comprises a bevel or rounding at an opening of the tongue groove.

15. The set of panels as claimed in claim 1, wherein the second edge and the edge groove comprise cooperating surfaces at the first side of the edge groove, for positioning of the second edge relative the edge groove in a depth direction of the edge groove.

16. The set of panels as claimed in claim 15, wherein the cooperating surfaces are a first surface of a recess at the second edge and a second surface of a recess at the edge groove.

17. An assembled furniture product comprising a frame and a back piece, wherein the frame comprises panels, wherein a first and a second corner edge of the frame each comprises a corner locking device for locking two adjacent panels to each other, said corner locking device comprising a tongue, wherein the corner locking device is un-lockable by displacing and/or compressing the tongue by a tool, wherein the back piece is connected to the frame by the angleable locking device according to claim 1.

\* \* \* \* \*